United States Patent
Fitch et al.

(10) Patent No.: US 6,824,885 B2
(45) Date of Patent: Nov. 30, 2004

(54) RELEASING THERMOPLASTIC FILM, AND METHOD OF MAKING

(75) Inventors: John Fitch, Middletown, RI (US); Steven J. Sargeant, Kingston, RI (US)

(73) Assignee: Toray Plastics (America), Inc., RI (US)

(*) Notice: Subject to any disclaimer, the term of this patent is extended or adjusted under 35 U.S.C. 154(b) by 0 days.

(21) Appl. No.: 10/139,851

(22) Filed: May 7, 2002

(65) Prior Publication Data

US 2003/0148127 A1 Aug. 7, 2003

Related U.S. Application Data

(60) Provisional application No. 60/323,118, filed on Sep. 18, 2001.

(51) Int. Cl.[7] .................. B32B 27/08; B32B 27/30; B32B 27/36; B32B 31/16
(52) U.S. Cl. ............... 428/483; 428/40.1; 428/41.3; 428/41.5; 428/41.8; 428/480; 428/910; 264/280; 264/288.4; 264/289.3; 264/290.2; 427/372.2; 427/384; 427/385.5; 427/393.5
(58) Field of Search .............. 428/40.1, 41.3, 428/41.5, 41.8, 480, 483, 910, 423.7, 40.2, 40.5; 264/280, 288.4, 289.3, 290.2, 298.2; 427/372.2, 384, 385.5, 393.5

(56) References Cited

U.S. PATENT DOCUMENTS

| | | | | |
|---|---|---|---|---|
| 4,075,389 A | * | 2/1978 | Vassiliades et al. ...... 428/313.3 |
| 4,182,788 A | * | 1/1980 | Vassiliades et al. ........ 428/40.2 |
| 4,749,432 A | * | 6/1988 | Ando et al. ................. 156/257 |
| 4,936,936 A | | 6/1990 | Rohrbacher | |
| 5,082,704 A | * | 1/1992 | Higgins ..................... 428/41.4 |
| 5,232,784 A | * | 8/1993 | Kim .......................... 428/451 |
| 5,756,214 A | * | 5/1998 | Waldron et al. ......... 428/423.1 |
| 5,932,352 A | * | 8/1999 | Higgins .................. 428/423.1 |
| 5,985,982 A | * | 11/1999 | Shipston et al. ............ 524/515 |
| 6,159,595 A | * | 12/2000 | Sumi ......................... 428/336 |
| 6,358,660 B1 | * | 3/2002 | Agler et al. ................. 430/126 |
| 6,551,692 B1 | * | 4/2003 | Dalvey et al. .............. 428/220 |

FOREIGN PATENT DOCUMENTS

| | | |
|---|---|---|
| EP | 0 342 826 A2 | 11/1989 |
| EP | 0 779 326 A1 | 6/1997 |
| EP | 1 048 708 A1 * | 11/2000 |
| WO | WO 99-15568 A1 * | 4/1999 |

OTHER PUBLICATIONS

Werner, Eberhard et al., "Polyester, Films." Encyclopedia of Polymer Science and Engineering, vol. 12 (1988), pp. 193–216.*

Schimtz, Peter et al., "Films." Ullmann's Encyclopedia of Industrial Chemistry, 5th Ed., vol. A11, pp. 85–95 (1988).*

* cited by examiner

Primary Examiner—Vivian Chen
(74) Attorney, Agent, or Firm—Piper Rudnick LLP

(57) ABSTRACT

Recycleable releasing polyethylene terephthalate film coated with a coating of polyethylene emulsion, polyurethane dispersion, or a mixture of the two, with an acrylic or polyester cobinder, which film is uniaxially oriented and thereafter coated with the coating and oriented in a direction transverse to the direction of the film's uniaxial orientation to generate a biaxially oriented film having a uniaxially oriented coating and a method of making the film.

11 Claims, No Drawings

RELEASING THERMOPLASTIC FILM, AND METHOD OF MAKING

This application claims benefit of U.S. Provisional Application Ser. No. 60/323,118 filed Sep. 18 2001.

FIELD OF THE INVENTION

This invention relates to a biaxially oriented polyethylene terephthalate film having a uniaxially oriented coating having low surface energy, resulting in excellent surface release characteristics and having recycleability and to a method for the production thereof.

BACKGROUND

Films prepared from biaxially oriented polyethylene terephthalate, herein referred to as "polyester films", are useful for a range of coating and printing applications as is well known in the art. For instance the production of labels, magnetic tapes and thermal transfer ribbons (TTR) often takes advantage of the high modulus of the polyester films and excellent coatability of the film surface. In such applications the polyester film acts as an anchoring material for the ink or coatings used to produce labels, magnetic tapes and TTR products, rendering the adhesion of the surface coating to the polyester film as being, essentially, permanent.

Often it is necessary to coat polyester films with a surface coating to improve the adhesion of the substrate to other materials like inks or subsequent surface coatings. For instance, it is well known in the art to coat polyester films with an acrylic coating to improve the adhesion of the polyester film to various solvent based inks. Such coating is often done at the point of manufacture of the polyester film or can be done as an offline step at converting.

For example, U.S. Pat. No. 5,648,159 describes the construction of a polyester base film for the production of high-resolution images made via the dry film photoresist process. The polyester film for coating the dry film resist base has requirements for a surface with particles with an Ra (centerline average roughness) >5 nM, an average particle diameter of between 0.01 $\mu$m to 3.0 $\mu$m, a maximum height of <1.5 $\mu$m and a haze value of 1.5%. Further, U.S. Pat. No. 6,037,100 describes the use of a biaxially oriented PET film as a coversheet for photoresist. The PET film has particular requirements for surface roughness as follows:

3.0 nm<–Sra<–50 nm 50 nm<–Spv<=500 nm 300 particles <=Summit Density<=20,000 particles, where Sra represents the mean centerline roughness, Spv represents the height from peak to valley, and Summit Density represents number of protuberances per unit area having a height of more than 1 nm.

However, there are many applications for which the adhesion to polyester film should be reduced. Such applications are often referred to as release applications in the art. However, polyester film has a relatively high surface energy. Such a high surface energy means that polyester film will readily adhere to many materials. In order to circumvent such adhesion it is known to coat polyester with a low surface energy material such as a silicone. The silicone surface then functions as the release layer from the polyester film structure.

For example, U.S. Pat. Nos. 5,728,339 and 5,672,428 describe an inline silicone coated polyethylene terephthalate (PET) film. U.S. Pat. No. 6,057,079 describes a self-winding dry film release film requiring a radiation-cured silicone coating for the PET surface to allow the film to self-wind without needing a separate release sheet. Additionally, U.S. Pat. No. 5,879,854 teaches a polyester film containing a silica particle with specific particle sizes and pore volumes for photoresist supporting applications.

Silicones, while being low surface energy materials, often encounter handling problems making them unsuitable for many applications in which a low surface energy film would be desirable. For instance, it is well known in the art that silicone materials often cyclize on polymerization, producing low molecular weight materials. Such materials are migratory and can, and do, often poison adhesive materials, rendering release values poor and unsuitable for commercial applications.

Similarly, it is well known in the art to coat waxes on polyester films to function as releasing agents. However, waxes, because of their low molecular weight, are prone to transfer and are, therefore, limited in utility as film surface materials.

It is further desirable that the releasing polyester film be recycleable. For plastic film reprocessing the term "recycleability" often refers to the ability of waste plastic, for instance, waste plastic collected from edge trim, poor roll formation or film near the mill core for instance, to be re-ground, remelted, mixed and re-extruded with fresh plastic to produce new sheet film. Discoloration of the film because of the presence of recycled components is undesirable for most applications. Other properties causing materials not to be satisfactorily recycleable include the presence of unmelted gels, an increase to the haze of the film, smoking at the sheet die, die lines and other defects. The undesirable components are not present in the novel film of this invention.

Although it is desirable to coat polyester films with low surface energy materials to create a low surface energy and releasable polyester film, the poor reprocessability of such materials is well known in the art to cause problems. Silicones, because of their inherent hydrophobic nature, are immiscible with PET. In addition to the requirements for a coating of about 0.05 to 0.10 $\mu$m thickness, the immiscibility of silicones with PET makes these products non-recycleable as an inline coating for PET. Therefore, it is desirable to create a low surface energy polyester film having a release surface coating that remains recycleable.

Accordingly, it would be advantageous to provide an oriented polyester film which is recycleable and has excellent surface release characteristics. It would also be advantageous to provide such a recycleable film having reduced adhesion to inks and other coatings but which does not comprise a cyclizable silicone surface or a transferable wax surface, either of which tends to interfere with successful recycleability of the resin of which the film is made.

SUMMARY OF THE INVENTION

We have discovered that all of the foregoing advantages can be achieved by creating a releasing polyethylene terephthalate (PET) film by inline stretching of a special coating in only one direction opposite to the drawing direction of the oriented film to create a biaxially oriented polyester film having a uniaxially oriented surface coating.

In one particular aspect, the invention relates to a releasing polyester film comprising an uniaxially oriented polyethylene terephthalate film having a surface coating wherein said polyester film has a low surface energy, and wherein said coating comprises at least one component selected from the group consisting of a polyethylene emulsion, or a polyurethane dispersion, and a mixture of polyethylene emulsion and polyurethane dispersion.

In another aspect, the invention relates to a method of making a releasing polyester film comprising the steps of stretching said film to generate a uniaxially oriented film and applying to said uniaxially oriented film a coating comprising at least one component selected from the group consisting of polyethylene emulsion, polyurethane dispersion, and a mixture of polyethylene emulsion and polyurethane dispersion, and then stretching said coated film to provide a biaxially oriented film having a uniaxially oriented coating.

DETAILED DESCRIPTION OF THE INVENTION

Polyethylene terephthalate films are often prepared by melting solid PET chips to a temperature beyond their crystalline domain melting points. The melted material is then fed, via a metering device such as a melt pump or otherwise extruded, into a sheet die. The resulting melt curtain is frozen to a highly amorphous state upon contact with a chilled surface casting roll. The resulting amorphous PET film is heated and stretched in the machine direction using a roller train. The resulting film is referred to a uniaxially oriented PET base film (B-film).

The uniaxially oriented PET base film can optionally be corona-treated to improve adhesion, and is then coated with a liquid coating solution. This solution is then dried by subsequent heating and stretching operations to produce a biaxially oriented PET base film, with a uniaxially oriented coated surface. The special coating solution is selected from the group consisting of a polyethylene emulsion and polyurethane dispersion, and mixtures thereof.

In order to more fully illustrate various embodiments of the present invention, the following non-limiting examples of applicable coatings are provided. All parts are by weight.

Peel force was measured by laminating Scotch 610 tape to each sample using a consistent application force of a two pound weight rolled twice. Samples were set for about 1 hour before pulling. The tape was then pulled from the surface of the coated film using a tensile tester, Shimadzu Model EZTest-500N at a pull rate of 12 inches/minute. The data reported was an average of 3 pulls.

Release from dry film resist: The polyethylene cover sheet was removed from a typical dry film release laminate (MacDermid Aquamer) under yellow light to prevent the start of polymerization of the photoresist. The coated test film was then laminated to the photoresist surface previously covered with the polyethylene cover sheet. Samples were placed in a 35 C. oven for 1 week under 1.5 psi. The samples were then removed from the oven and the cover film was removed. The release from Dry Film Resist of the samples ("release rating") were scored 1–3, 1 being easy, 2 being zippy, and 3 being tight. A release rating of 1 or 2 is acceptable, while a release rating of 3 is unacceptable.

EXAMPLE 1

| Coating Materials | Amount |
| --- | --- |
| Polyethylene Emulsion (1) | 5 Parts |
| De-ionized Water | 97 Parts |
| Oligoether Fluorosurfactant (2) | 0.0002 Parts |

(1) Liquilube 480, available from Carroll Scientific
(2) Zonyl FSO, available from DuPont The mixture was coated on the B-film and sideways dried and sideways drawn along with the film to yield a low surface energy polyethylene terephthalate biaxially oriented film having a uniaxially oriented coating having a thickness of 0.09 μm.

EXAMPLE 2

| Coating Materials | Amount |
| --- | --- |
| Polyethylene Emulsion (1) | 3 Parts |
| De-ionized Water | 97 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.05 μm.

EXAMPLE 3

| Coating Materials | Amount |
| --- | --- |
| Polyethylene Emulsion (1) | 1 Parts |
| De-ionized Water | 97 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.01 μm.

EXAMPLE 4

| Coating Materials | Amount |
| --- | --- |
| Polyethylene Emulsion (1) | 5 Parts |
| Polystyrene/methylmethacrylate (3) | 0.5 Parts |
| De-ionized Water | 95 Parts |
| Oligoether Fluorosurfactant (2) | 0.0002 Parts |

(3) Setalux 33-3372, available from Akzo-Nobel Resins

The mixture was coated on the B-film and sideways dried and sideways drawn along with the film, to yield a low surface energy polyethylene terephthalate biaxially oriented film having a uniaxially oriented coating having a thickness of 0.09 μm.

EXAMPLE 5

| Coating Materials | Amount |
| --- | --- |
| Polyethylene Emulsion (1) | 3 Parts |
| Polystyrene/methylmethacrylate (3) | 0.3 Parts |
| De-ionized Water | 97 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.05 μm.

EXAMPLE 6

| Coating Materials | Amount |
| --- | --- |
| Polyethylene Emulsion (1) | 1 Parts |
| Polystyrene/methylmethacrylate (3) | 0.1 Parts |
| De-ionized Water | 99 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.01 μm.

EXAMPLE 7

| Coating Materials | Amount |
| --- | --- |
| Polyethylene Emulsion (1) | 3 Parts |
| Polyestersulfonate (4) | 0.3 Parts |
| De-ionized Water | 97 Parts |
| Oligoether Fluorosurfactant (2) | 0.0002 Parts |

(4) Eastek 1000, available from Lawter

The mixture was coated on the B-film and sideways dried and sideways drawn along with the film, to yield a low surface energy polyethylene terephthalate biaxially oriented film having a uniaxially oriented coating having a thickness of 0.05 μm.

EXAMPLE 8

| Coating Materials (All parts are by weight) | Amount |
| --- | --- |
| Polyurethane Dispersion (5) | 3 Parts |
| De-ionized Water | 97 Parts |
| Oligoether Fluorosurfactant (2) | 0.0002 Parts |

(5) Polyurethane co-polydimethylsiloxane dispersion available from Applied Chemical Concepts, tradename ER-1000.

The mixture was coated on the B-film and sideways dried and sideways drawn along with the film, to yield a low surface energy polyethylene terephthalate biaxially oriented film having a uniaxially oriented coating having a thickness of 0.09 μm.

EXAMPLE 9

| Coating Materials | Amount |
| --- | --- |
| Polyurethane Emulsion (5) | 3 Parts |
| De-ionized Water | 97 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.05 μm.

EXAMPLE 10

| Coating Materials | Amount |
| --- | --- |
| Polyurethane Emulsion (5) | 3 Parts |
| De-ionized Water | 97 Parts |
| Oligoether Fluorosurfactant (2) | 0.0002 Parts |

The mixture was coated on the B-film and sideways dried and sideways drawn along with the film, to yield a low surface energy polyethylene terephthalate biaxially oriented film having a uniaxially oriented coating having a thickness of 0.01 μm.

Comparative Example 1

| Coating Materials | Amount |
| --- | --- |
| Polyestersulfonate (4) | 5 Parts |
| De-ionized Water | 95 Parts |
| Oligoether Fluorosurfactant (2) | 0.0002 Parts |

The mixture was coated on the B-film and sideways dried and sideways drawn along with the film, to yield a polyethylene terephthalate biaxially oriented film having a uniaxially oriented coating having a thickness of 0.05 μm.

Comparative Example 2

| Coating Materials | Amount |
| --- | --- |
| Polystyrene/methylmethacrylate (3) | 5 Parts |
| De-ionized Water | 95 Parts |
| Oligoether Fluorosurfactant (2) | 0.0002 Parts |

The mixture was coated on the B-film and sideways dried and sideways drawn along with the film, to yield a polyethylene terephthalate biaxially oriented film having a uniaxially oriented coating having a thickness of 0.05 μm.

In some examples described here, a co-binder was added to improve the adhesion of the low surface energy PE dispersion to a corona-treated polyester film. Such binders can be added to improve the adhesion of the release coating to PET but the release rating feel from a 1 (easy release from dry film photoresist, dry film release) to a 3 (tight) as seen in Table 1. The peel force used to remove the release layer from the dry film release also shows an increase regardless of the coating thickness as seen in Examples 7, 8 and 9. For commercial utility, a release value of 3 is deemed unsuitable.

The nature of the co-binders, if used, is an important consideration in accordance with this invention. The acrylic and polyester emulsions evaluated as co-binders have excellent extensibility and adhesion to the polyester film. The preferred co-binders include an acrylic binder for its compatibility with the chemistry of dry film photoresist. Regardless of the release/binder ratio the surface energy should be below about 36 dynes in order to function suitably as a release film for commercial applications.

TABLE 1

| Example # | Coating Material | Co-Binder Used | Coating Thickness | Dry Film Resist Release Value |
|---|---|---|---|---|
| 1 | Polyethylene Emulsion (1) | None | 0.09 μm | 1 |
| 2 | Polyethylene Emulsion (1) | None | 0.05 μm | 1 |
| 3 | Polyethylene Emulsion (1) | None | 0.01 μm | 1 |
| 4 | Polyethylene Emulsion (1) | Polystyrene/methylmethacrylate (3) | 0.09 μm | 2 |
| 5 | Polyethylene Emulsion (1) | Polystyrene/methylmethacrylate (3) | 0.05 μm | 2 |
| 6 | Polyethylene Emulsion (1) | Polystyrene/methylmethacrylate (3) | 0.01 μm | 2 |
| 7 | Polyethylene Emulsion (1) | Polyestersulfonate (4) | 0.05 μm | 2 |
| 8 | Polyurethane Dispersion (5) | None | 0.09 μm | 1 |
| 9 | Polyurethane Dispersion (5) | None | 0.05 μm | 1 |
| 10 | Polyurethane Dispersion (5) | None | 0.01 μm | 1 |
| Com. Ex. 1 | None | Polyestersulfonate (4) | 0.05 μm | 3 |
| Com. Ex. 2 | None | Polystyrene/methylmethacrylate (3) | 0.05 μm | 3 |

EXAMPLE 11

| Coating Materials | Amount |
|---|---|
| Polyethylene Emulsion (6) | 1.65 Parts |
| Polyestersulfonate (4) | 3.35 Parts |
| De-ionized Water | 95 Parts |
| Oligoether Fluorosurfactant (2) | 0.0002 Parts |

(6) Chemcor Polyemulsion 325N40

The mixture was coated on the B-film and sideways dried and sideways drawn along with the film, to yield a low surface energy polyethylene terephthalate biaxially oriented film having a uniaxially oriented coating having a thickness of 0.09 μm.

EXAMPLE 12

| Coating Materials | Amount |
|---|---|
| Polyethylene Emulsion (7) | 0.5 Parts |
| Polystyrene/methylmethacrylate (3) | 4.5 Parts |
| De-ionized Water | 95 Parts |
| Oligoether Fluorosurfactant | 0.0002 Parts |

(7) Chemcor Polyemulsion XL-21

The mixture was coated on the B-film and sideways dried and sideways drawn along with the film, to yield a low surface energy polyethylene terephthalate biaxially oriented film having a uniaxially oriented coating having a thickness of 0.09 μm.

EXAMPLE 13

| Coating Materials | Amount |
|---|---|
| Polyethylene Emulsion (8) | 0.5 Parts |
| Polystyrene/methylmethacrylate (3) | 4.5 Parts |
| De-ionized Water | 95 Parts |
| Oligoether Fluorosurfactant (2) | 0.0002 Parts |

(8) Chemcor Polyemulsion A25

The mixture was coated on the B-film and sideways dried and sideways drawn along with the film, to yield a low surface energy polyethylene terephthalate biaxially oriented film having a uniaxially oriented coating having a thickness of 0.09 μm.

EXAMPLE 14

| Coating Materials | Amount |
|---|---|
| Polyethylene Emulsion (9) | 5 Parts |
| De-ionized Water | 95 Parts |
| Oligoether Fluorosurfactant (2) | 0.0002 Parts |

(9) Chemslip

The mixture is coated on the B-film and sideways dried and sideways drawn along with the film, to yield a low surface energy polyethylene terephthalate biaxially oriented film having a uniaxially oriented coating having a thickness of 0.09 μm.

Comparative Example 3

| Coating Materials | Amount |
|---|---|
| Polypropylene Dispersion (10) | 1.65 Parts |
| Polyestersulfonate (4) | 3.35 Parts |
| De-ionized Water | 95 Parts |
| Oligoether Fluorosurfactant (2) | 0.0002 Parts |

(10) Chemcor Polyemulsion 43N40

The mixture is coated on the B-film and sideways dried and sideways drawn along with the film, to yield a polyethylene terephthalate biaxially oriented film having a uniaxially oriented coating having a thickness of 0.09 μm.

Comparative Example 4

| Coating Materials | Amount |
|---|---|
| Wax Dispersion (11) | 0.5 Parts |
| Polystyrene/methylmethacrylate (3) | 4.5 Parts |
| De-ionized Water | 95 Parts |
| Oligoether Fluorosurfactant (2) | 0.0002 Parts |

(11) Chemcor Polyemulsion FG#3

The mixture is coated on the B-film and sideways dried and sideways drawn along with the film, to yield a low surface energy polyethylene terephthalate biaxially oriented film having a uniaxially oriented coating having a thickness of 0.09 μm.

Release additives were evaluated with binders as seen in Table 2. Examples 11, 12, 13, and 14 illustrate that other polyethylene dispersions may also be used as the release agent. Comparative Examples 3 and 4 illustrate other "wax-like" dispersions that do not release well from dry film photoresist.

TABLE 2

| Example | Release additive | Release/binder type | Coating thickness (microns) | Release additive/binder ratio | Release from Dry Film Resist* |
|---------|------------------|---------------------|-----------------------------|-------------------------------|-------------------------------|
| 11 | Polyethylene emulsion (6) | Polyester-sulfonate (4) | 0.09 | 1:2 | 1 |
| 12 | Polyethylene emulsion (7) | Polystyrene/methylmethacrylate (3) | 0.09 | 1:9 | 1 |
| 13 | Polyethylene emulsion (8) | Polystyrene/methylmethacrylate (3) | 0.09 | 1:9 | 2 |
| 14 | Polyethylene emulsion (9) | None | 0.09 | 1:19 | 1 |
| Com. Ex. 3 | Polypropylene emulsion (10) | Polyester-sulfonate (4) | 0.09 | 1:2 | 3 |
| Com. Ex. 4 | Wax dispersion (11) | Polystyrene/methylmethacrylate (3) | 0.09 | 1:9 | 3 |

*1 = easy; 2 = zippy and 3 = tight

We claim:

1. A releasing polyester film comprising an uniaxially oriented polyethylene terephthalate film having a surface coating wherein said polyester film has a surface energy of about 36 dynes or less, and wherein said coating consists essentially of a polyethylene emulsion.

2. The releasing polyester film of claim 1, further comprising an acrylic or polyester co-binder.

3. The polyester film of claim 2, wherein said coating comprises about 0.1 to about 5% by weight acrylic acid as the acrylic co-binder, based on the weight of the coating.

4. The releasing polyester film of claim 1, wherein said coating further comprises an oligoether fluorosurfactant.

5. The releasing polyester film of claim 1, wherein said uniaxially oriented polyethylene terephthalate film having a surface coating is stretched to provide a biaxially oriented polyethylene terephthalate film having a uniaxially oriented coating.

6. The releasing polyester film according to claim 5, wherein said coating has a thickness of about 0.10 μm or less.

7. A method of making a releasing polyester film comprising the steps of stretching said film to generate a uniaxially oriented film and applying to said uniaxially oriented film a coating consisting essentially of a polyethylene emulsion, and then stretching said coated film to provide a biaxially oriented film with a surface energy of about 36 dynes or less and having a uniaxially oriented coating.

8. The method defined in claim 7 further comprising the steps of: drying said coating after application of said coating to said film and drawing said coated film to yield a coating thickness of about 0.10 μm or less.

9. The method according to claim 7, wherein said uniaxially oriented film is corona-treated prior to said application of said coating to said film.

10. The method defined in claim 7 wherein said polyester film is polyethylene terephthalate film and said coating further comprises an acrylic polyester co-binder.

11. A polyester film comprising a biaxially oriented polyethylene terephthalate film having a uniaxially oriented coating consisting essentially of a polyethylene emulsion, wherein said polyester film has a surface energy about 36 dynes or less.

* * * * *